(12) United States Patent
Wermter et al.

(10) Patent No.: US 7,572,868 B2
(45) Date of Patent: Aug. 11, 2009

(54) COMPOSITION AND PROCESS FOR THE CONTROLLED SYNTHESIS OF BLOCK COPOLYMERS

(75) Inventors: Hendrik Wermter, Bensheim (DE); Dirk Simon, Lörrach-Brombach (DE); Rudolf Pfaendner, Rimbach (DE)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 425 days.

(21) Appl. No.: 10/568,376

(22) PCT Filed: Aug. 18, 2004

(86) PCT No.: PCT/EP2004/051817

§ 371 (c)(1),
(2), (4) Date: Feb. 14, 2006

(87) PCT Pub. No.: WO2005/021630

PCT Pub. Date: Mar. 10, 2005

(65) Prior Publication Data

US 2006/0287451 A1    Dec. 21, 2006

(30) Foreign Application Priority Data

Aug. 27, 2003    (EP) .................................. 03102656

(51) Int. Cl.
*C08F 2/38* (2006.01)
*C08F 293/00* (2006.01)
(52) U.S. Cl. ...................... 526/204; 526/22; 526/232.1; 525/256; 525/259; 525/299

(58) Field of Classification Search ................. 526/204, 526/219.2, 220, 227, 230, 232.1; 525/256, 525/259, 273, 299
See application file for complete search history.

(56) References Cited

U.S. PATENT DOCUMENTS

| 3,222,334 | A | * | 12/1965 | Demme ........................ 526/83 |
| 5,919,871 | A | | 7/1999 | Nicol et al. ............... 525/333.8 |
| 6,242,546 | B1 | | 6/2001 | Nakai et al. .................. 526/211 |
| 6,255,448 | B1 | | 7/2001 | Grimaldi et al. ............ 528/398 |
| 6,262,179 | B1 | | 7/2001 | Nicol .......................... 525/192 |
| 6,262,206 | B1 | | 7/2001 | Nesvadba et al. ........... 526/220 |
| 6,521,710 | B1 | | 2/2003 | Roth et al. ................... 525/259 |
| 2002/0010294 | A1 | | 1/2002 | Nakai et al. ................. 526/204 |
| 2005/0215720 | A1 | | 9/2005 | Fink et al. .................... 525/242 |
| 2006/0020105 | A1 | | 1/2006 | Wunderlich-Wippert et al. . 528/403 |

FOREIGN PATENT DOCUMENTS

WO            00/42079         7/2000

* cited by examiner

*Primary Examiner*—Fred M Teskin
(74) *Attorney, Agent, or Firm*—Tyler A. Stevenson

(57) ABSTRACT

The present invention relates to a polymerizable composition comprising a) at least one ethylenically unsaturated monomer and b) at least one hydroxylamine of high molecular weight, preferably a long chain alkyl substituted hydroxylamine. Further aspects of the present invention are a process for polymerizing ethylenically unsaturated monomers, and the use of high molecular weight hydroxylamines for controlled polymerization.

7 Claims, No Drawings

COMPOSITION AND PROCESS FOR THE CONTROLLED SYNTHESIS OF BLOCK COPOLYMERS

The present invention relates to a polymerizable composition comprising a) at least one ethylenically unsaturated monomer and b) at least one hydroxylamine, nitrone or alkyl N-oxid of high molecular weight, preferably a long chain alkyl substituted hydroxylamine. Further aspects of the present invention are a process for polymerizing ethylenically unsaturated monomers, and the use of high molecular weight hydroxylamines, nitrones or alkyl N-oxides for controlled polymerization.

Due to the unique properties (appearance, mechanical properties, heat resistance) of vinyl block copolymers with narrow molecular weight distribution the industrial and technical value of such polymers is high. Currently, three methods appear to be most efficient for controlled radical polymerization: stable free radical polymerization, best represented by polymerization mediated with tetramethyl piperidine-N-oxyl (TEMPO), metal-catalyzed atom-transfer radical polymerization (ATRP) and the reversible addition-fragmentation chain transfer (RAFT) process. However, all of these methods have certain disadvantages. The polymerization with TEMPO is relatively slow and TEMPO itself is expensive, the advantages of ATRP are often overcompensated by the difficulties of catalyst removal from the polymer and the polymerization with RAFT needs specific dithioesters for specific monomers and the products are often colored and have an unpleasant odor.

U.S. Pat. Nos. 6,242,546 and 6,350,836 therefore suggest a solution to overcome these problems by using hydroxylamines (e.g. dimethylhydroxylamine, diethylhydroxylamine, isopropyl-hydroxylamine, dibenzylhydroxylamine, N-hydroxylmaleimide, N-hydroxylsuccinimide, N-hydroxylphthalimide . . . ), as an easy and inexpensive alternative, for the controlled radical polymerization of vinyl polymers.

The disadvantages of the hydroxylamine derivatives used there are mainly the high volatility at elevated temperatures, which are necessary for the polymerization of many vinyl monomers and the missing living character of the synthesized hydroxylamine terminated polymers i.e. the possibility to build up block copolymer structures via hydroxylamine terminated macro initiators.

In contrast to low molecular weight hydroxylamines, high molecular weight hydroxylamines, in particular long chain alkyl hydroxylamines, offer the possibility to build up block structures because of the remaining living character of the products of the initial polymerization step The present invention provides the possibility to synthesize block copolymer structures by using high molecular weight, in particular long chain alkyl hydroxylamines as controlling agents in the radical polymerization of vinyl monomers. Thus radical polymerization of a monomer A followed by a second polymerization step with a monomer B is possible. The present invention provides a method to obtain di-or even tri-block copolymers respectively, polymer structures, which exhibit interesting polymer properties due to their defined narrow molecular weight distribution of the individual blocks.

One aspect of the invention is a polymerizable composition comprising
  a) an ethylenically unsaturated monomer;
  b) a radical polymerization initiator; and
  c) a hydroxylamine, a nitrone or an alkyl N-oxid having a molecular weight of more than 250 g/mol.

Preferably the ethylenically unsaturated monomer is selected from the group consisting of ethylene, propylene, n-butylene, i-butylene, styrene, substituted styrene, conjugated dienes, acrolein, vinyl acetate, vinylpyrrolidone, vinylimidazole, maleic anhydride, (alkyl)acrylic acidanhydrides, (alkyl)acrylic acid salts, (alkyl)acrylic esters, (alkyl) acrylonitriles, (alkyl)acrylamides, vinyl halides or vinylidene halides.

For example the ethylenically unsaturated monomer is a compound of formula $CH_2=C(R_a)-(C=Z)-R_b$, wherein Z is O or S; $R_a$ is hydrogen or $C_1$-$C_4$alkyl, $R_b$ is $NH_2$, $O^-(Me^+)$, glycidyl, unsubstituted $C_1$-$C_{18}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, di($C_1$-$C_{18}$alkyl)amino, hydroxy-substituted $C_1$-$C_{18}$alkylamino or hydroxy-substituted di($C_1$-$C_{18}$alkyl)amino, $-O-CH_2-CH_2-N(CH_3)_2$ or $-O-CH_2-CH_2-N^+H(CH_3)_2$ $An^-$; $An^-$ is a anion of a monovalent organic or inorganic acid; Me is a monovalent metal atom or the ammonium ion.

Special preference is given to a polymerizable composition wherein the ethylenically unsaturated monomer is styrene, n-butylacrylate, tert-butylacrylate, methylacrylate, ethylacrylate, propylacrylate, hexylacrylate or hydroxyethylacrylate.

Examples of acids from which the anion $An^-$ is derived are $C_1$-$C_{12}$carboxylic acids, organic sulfonic acids such as $CF_3SO_3H$ or $CH_3SO_3H$, mineralic acids such as HCl, HBr or HI, oxo acids such as $HClO_4$ or complex acids such as $HPF_6$ or $HBF_4$.

Examples for $R_a$ as $C_2$-$C_{100}$alkoxy interrupted by at least one O atom are of formula

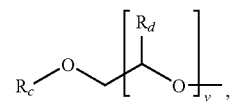

wherein $R_c$ is $C_1$-$C_{25}$alkyl, phenyl or phenyl substituted by $C_1$-$C_{18}$alkyl, $R_d$ is hydrogen or methyl and v is a number from 1 to 50. These monomers are for example derived from non ionic surfactants by acrylation of the corresponding alkoxylated alcohols or phenols. The repeating units may be derived from ethylene oxide, propylene oxide or mixtures of both.

Further examples of suitable acrylate or methacrylate monomers are given below.

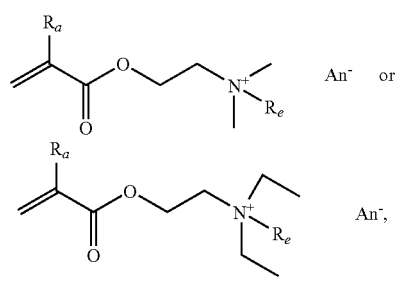

wherein $An^-$ and $R_a$ have the meaning as defined above and $R_e$ is methyl or benzyl. $An^-$ is preferably $Cl^-$, $Br^-$ or $^-O_3S-CH_3$.

Further acrylate monomers are

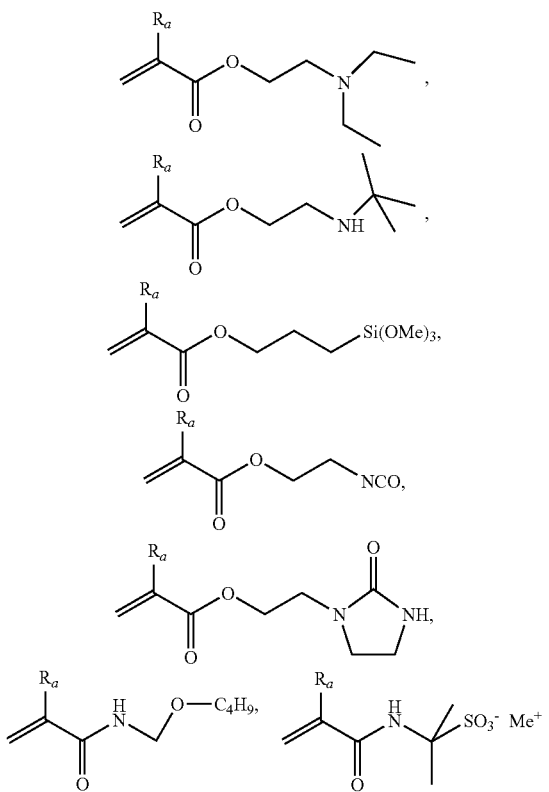

Examples for suitable monomers other than acrylates are

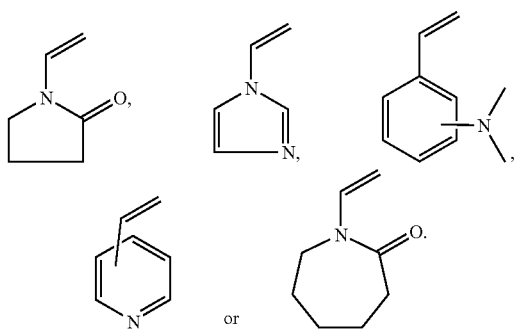

Preferably $R_a$ is hydrogen or methyl, $R_b$ is $NH_2$, gycidyl, unsubstituted or with hydroxy substituted $C_1$-$C_4$alkoxy, unsubstituted $C_1$-$C_4$alkylamino, di($C_1$-$C_4$alkyl)amino, hydroxy-substituted $C_1$-$C_4$alkylamino or hydroxy-substituted di($C_1$-$C_4$alkyl)amino; and Z is oxygen.

More preferred the ethylenically unsaturated monomer is an acrylic acid ester, acrylamide, acrylnitrile, methacrylic acid ester, methacrylamide, methacrylnitrile.

Acrylic acid esters and methacrylic acid esters are typically $C_1$-$C_{18}$alkyl esters.

For example the radical polymerization initiator is a azo compound, a peroxide, a perester or a hydroperoxide.

Preference is given to a polymerizable composition wherein the radical polymerization initiator is a azo compound or a peroxide.

Specific preferred radical polymerization initiators are 2,2'-azobisisobutyronitrile, 2,2'-azobis(2-methyl-butyronitrile), 2,2'-azobis(2,4-dimethylvaleronitrile), 2,2'-azobis(4-methoxy-2,4dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide}; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis (2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononanoate, 2,5-dimethylhexane 2,5-dibenzoate, t-butyl peracetate, t-amyl perbenzoate, t-butyl perbenzoate, 2,2-bis (t-butylperoxy) butane, 2,2 bis (t-butylperoxy) propane, dicumyl peroxide, 2,5dimethylhexane-2,5-di-t-butylperoxide, 3-t-butylperoxy 3-phenylphthalide, di-t-amyl peroxide, α, α'-bis(t-butylperoxy isopropyl) benzene, 3,5-bis (t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide.

For example in component c) the hydroxylamine, the nitrone or the alkyl N-oxid having a molecular weight of more than 250 g/mol are of formulae (I), II) or (III)

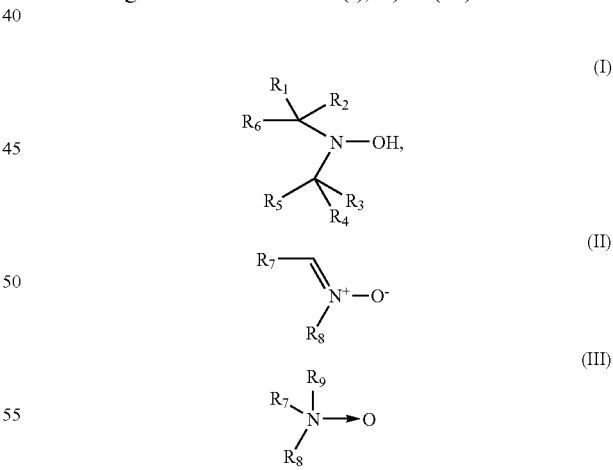

wherein
$R_1$, $R_2$, $R_3$ and $R_4$ are independently hydrogen, phenyl or $C_1$-$C_4$alkyl;
$R_5$ and $R_6$ are independently $C_7$-$C_{35}$alkyl, $C_7C_{35}$alkenyl or $C_7$-$C_{35}$alkinyl, which may be unsubstituted or substituted by phenyl, halogen, $NH_2$, $N(R_{21})_2$, —OH, —CN, —NO$_2$, or —COOR$_{21}$; or which may be interrupted by —O— or —C(O)—; or $R_5$ and $R_6$ together are an alkylene bridge, which may be interrupted by a —O—, —C(O)— or a —N(C$_1$-C$_{18}$alkyl)— group to form a heterocyclic 5, 6, 7 or 8 membered ring, which may be further substituted by a —O—C(O)—]$_n$R$_{20}$, NR$_{21}$—C(O)—]$_n$R$_{20}$ or a ketal group; n is 1 or 2; wherein, when n is 1, $R_{20}$ is hydrogen or $C_1$-$C_{18}$alkyl and, when n is 2, $R_{20}$ is $C_1$-$C_{18}$alkylene; $R_{21}$ is hydrogen or $C_1$-$C_{18}$alkyl; $R_7$ and $R_8$ are independently $C_8$-$C_{38}$alkyl; and $R_9$ is $C_1$-$C_4$alkyl.

For example the the hydroxylamine, the nitrone or the alkyl N-oxid has a molecular weight of more than 300 g/mol, for instance more than 350 g/mol.

The alkyl radicals in the various substituents may be linear or branched. Examples of alkyl containing 7 to 35 carbon atoms are methyl, heptyl, octyl, 2-ethylhexyl, t-octyl, nonyl, decyl, undecyl, dodecyl, tridecyl, tetradecyl, hexadecyl, octadecyl and eicosyl.

Alkenyl with 7 to 35 carbon atoms is a linear or branched radical as for example n-2-octenyl, n-2-dodecenyl, iso-dodecenyl, oleyl, n-2-octadecenyl oder n-4-octadecenyl.

Alkinyl with with 7 to 35 carbon atoms is a linear or branched radical.

5, 6, 7 or 8 membered heterocyclic rings are for example azepin, piperidine or pyrolidine.

Examples for hydroxy substituted alkyl are hydroxy propyl, hydroxy butyl or hydroxy hexyl.

$C_7$-$C_{35}$alkyl interrupted by at least one O atom is for example —(CH$_2$)$_3$—CH$_2$—O—CH$_2$—CH$_3$, —(CH$_2$)$_6$—CH$_2$—O—CH$_3$ or —CH$_2$—CH$_2$—O—CH$_2$—CH$_2$—CH$_2$—O—CH$_2$CH$_3$. It is preferably derived from polyethlene glycol. A general description is —((CH$_2$)$_a$—O)$_b$—H/CH$_3$, wherein a is a number from 4 to 10 and b is a number from 2 to 10.

Special preference is given to a polymerizable composition wherein the hydroxylamine is of formula (I).

In one preferred embodiment of the invention the compound of formula (I) is of formula A', A", B' or O'

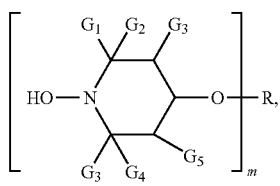

(A')

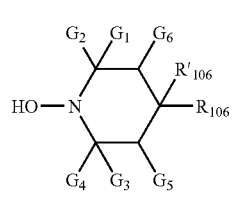

(A")

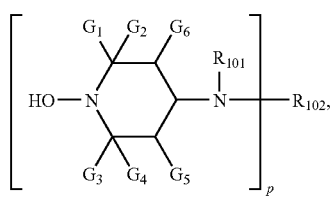

(B')

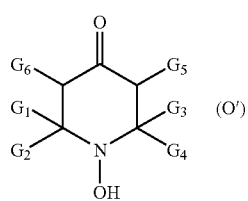

(O')

wherein m is 1,

R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

p is 1;

$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —CH$_2$CH(OH)-Z or of the formula —CO-Z or —CONH-Z wherein Z is hydrogen, methyl or phenyl;

$R_6$ and $R'_6$ together are both hydrogen, a group =O or =N—O—R$_{120}$ wherein $R_{102}$ is H, straight or branched $C_1$-$C_{18}$alkyl, $C_3$-$C_{18}$alkenyl or $C_3$-$C_{18}$alkinyl, which may be unsubstituted or substitued, by one or more OH, $C_1$-$C_8$alkoxy, carboxy, $C_1$-$C_8$alkoxycarbonyl; $C_5$-$C_{12}$cycloalkyl or $C_5$-$C_{12}$cycloalkenyl; phenyl, $C_7$-$C_9$phenylalkyl or naphthyl which may be unsubstituted or substituted by one or more $C_1$-$C_8$alkyl, halogen, OH, $C_1$-$C_8$alkoxy, carboxy, $C_1$-$C_8$alkoxycarbonyl;

—C(O)—$C_1$-$C_{38}$alkyl, or an acyl moiety of α,β-unsaturated carboxylic acid having 3 to 5 carbon atoms or of an aromatic carboxylic acid having 7 to 15 carbon atoms;

—SO$_3$$^-$Q$^+$, —PO(O$^-$Q$^+$)$_2$, —P(O)(OR$_2$)$_2$, —SO$_2$—R$_2$, —CO—NH—R$_2$, —CONH$_2$, COOR$_2$, or Si(Me)$_3$, wherein Q$^+$ is H$^+$, ammnonium or an alkali metal cation; or $R_{106}$ and $R'_{106}$ are independently —O—$C_1$-$C_{12}$alkyl, —O—$C_3$-$C_{12}$alkenyl, —O—$C_3$-$C_{12}$alkinyl, —O—$C_5$-$C_8$cycloalkyl, —O-phenyl, —O-naphthyl, —O—$C_7$-$C_9$phenylalkyl; or $R_{106}$ and $R'_{106}$ together form one of the bivalent groups —O—C(R$_{121}$)(R$_{122}$)—CH(R$_{123}$)—O—, —O—CH(R$_{121}$)—CH$_{122}$—C(R$_{122}$)(R$_{123}$)—O—, —O—CH(R$_{122}$)—CH$_2$C(R$_{121}$)(R$_{123}$)—O—, —O—CH$_2$—C(R$_{121}$)(R$_{122}$)—CH(R$_{123}$)—O—, —O-o-phenylene-O—, —O-1,2-cyclohexyliden-O—,

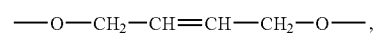

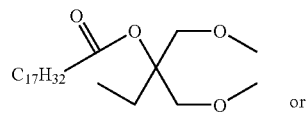

or

-continued

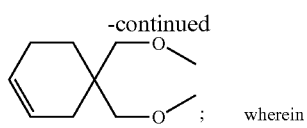
wherein $R_{121}$ is hydrogen, $C_1$-$C_{12}$alkyl, COOH, COO—($C_1$-$C_{12}$)alkyl or $CH_2OR_{124}$;

$R_{122}$ and $R_{123}$ are independently hydrogen, methyl ethyl, COOH or COO—($C_1$-$C_{12}$)alkyl;

$R_{124}$ is hydrogen, $C_1$-$C_{12}$alkyl, benzyl, or a monovalent acyl residue derived from an aliphatic, cycloaliphatic or aromatic monocarboxylic acid having up to 18 carbon atoms;

$G_6$ is hydrogen and $G_5$ is hydrogen or $C_1$-$C_4$alkyl, and $G_1$, $G_2$, $G_3$ and $G_4$ are methyl; or $G_1$ and $G_3$ are methyl and $G_2$ and $G_4$ are ethyl or propyl or $G_1$ and $G_2$ are methyl and $G_3$ and $G_4$ are ethyl or propyl.

$C_3$-$C_{12}$cycloalkyl is typically, cyclopropyl, cyclopentyl, methylcyclopentyl, dimethylcyclopentyl, cyclohexyl, methylcyclohexyl or trimethylcyclohexyl.

$C_6$-$C_{10}$ aryl is for example phenyl or naphthyl, but also comprised are $C_1$-$C_4$alkyl substituted phenyl, $C_1$-$C_4$alkoxy substituted phenyl, hydroxy, halogen or nitro substituted phenyl. Examples for alkyl substituted phenyl are ethylbenzene, toluene, xylene and its isomers, mesitylene or isopropylbenzene. Halogen substituted phenyl is for example dichlorobenzene or bromotoluene.

Alkoxy substituents are typically methoxy, ethoxy, propoxy or butoxy and their corresponding isomers.

$C_7$-$C_9$phenylalkyl is benzyl, phenylethyl or phenylpropyl.

$C_5$-$C_{10}$heteroaryl is for example pyrrol, pyrazol, imidazol, 2,4, dimethylpyrrol, 1-methylpyrrol, thiophene, furane, furfural, indol, cumarone, oxazol, thiazol, isoxazol, isothiazol, triazol, pyridine, α-picoline, pyridazine, pyrazine or pyrimidine.

If R is a monovalent radical of a carboxylic acid, it is, for example, an acetyl, propionyl, butyryl, valeroyl, caproyl, stearoyl, lauroyl, acryloyl, methacryloyl, benzoyl, cinnamoyl or β-(3,5-di-tert-butyl-4-hydroxyphenyl)propionyl radical.

$C_1$-$C_{18}$alkanoyl is for example, formyl, propionyl, butyryl, octanoyl, dodecanoyl but preferably acetyl and $C_3$-$C_5$alkenoyl is in particular acryloyl.

The above compounds and their preparation are described in GB 2335190 and in WO 02/48205.

A suitable compound is for example

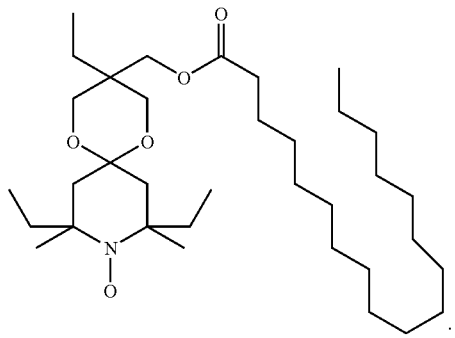

In another preferred embodiment of the invention in the hydroxylamine of formula (I) $R_1$, $R_2$, $R_3$ and $R_4$ are hydrogen; and $R_5$ and $R_6$ independently are $C_7$-$C_{35}$alkyl or $C_7$-$C_{35}$alkenyl.

The above open chain hydroxylamines can be prepared according to standard methods and are largely items of commerce.

A further aspect of the invention is a process for preparing an oligomer, a cooligomer, a polymer or a copolymer (block, random or graft) by free radical polymerization of at least one ethylenically unsaturated monomer or oligomer, which comprises (co)polymerizing the monomer or monomers/oligomers in the presence of b) a free radical initiator and c) a hydroxylamine, a nitrone or an alkyl N-oxid having a molecular weight of more than 250 g/mol.

After the polymerization step is completed the reaction mixture may be cooled down to a temperature below 60° C., preferably to room temperature. The polymer may be stored at this temperature without further reactions occuring.

The process may be carried out in the presence of an organic solvent or in the presence of water or in mixtures of organic solvents and water. Additional cosolvents or surfactants, such as glycols or ammonium salts of fatty acids, may be present. Other suitable cosolvents are described hereinafter.

When acrylic or methacrylic monomers are polymerized, the process is preferably carried out in the presence of an organic solvent. The concentration of the monomer in the organic solvent may influence polymerization rate and final conversion. The concentration may, for example, vary from 5% to 80% by weight, based on the solvent. It is not necessary that the whole amount of monomer is present at the beginning of the polymerization. It is also possible to add further monomer after the polymerization reaction has already started.

If organic solvents are used, suitable solvents or mixtures of solvents are typically pure alkanes (hexane, heptane, octane, isooctane), aromatic hydrocarbons (toluene, xylene), halogenated hydrocarbons (chlorobenzene), alkanols (methanol, ethanol, ethylene glycol, ethylene glycol monomethyl ether), esters (ethyl acetate, propyl, butyl or hexyl acetate) and ethers (diethyl ether, dibutyl ether, ethylene glycol dimethyl ether), or mixtures thereof.

The aqueous polymerization reactions can be supplemented with a water-miscible or hydrophilic cosolvent to help ensure that the reaction mixture remains a homogeneous single phase throughout the monomer conversion. Any water-soluble or water-miscible cosolvent may be used, as long as the aqueous solvent medium is effective in providing a solvent system which prevents precipitation or phase separation of the reactants or polymer products until after all polymerization reactions have been completed. Exemplary cosolvents useful in the present invention may be selected from the group consisting of aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl carbitol or cellosolve, amino alcohols, ketones, and the like, as well as derivatives thereof and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof. When mixtures of water and water-soluble or water-miscible organic liquids are selected as the aqueous reaction media, the water to cosolvent weight ratio is typically in the range of about 100:0 to about 10:90.

The process is particularly useful for the preparation of block copolymers.

Block copolymers are, for example, block copolymers of polystyrene and polyacrylate (e.g., poly(styrene-co-acrylate) or poly(styrene-co-acrylate-co-styrene). They are useful as adhesives or as compatibilizers for polymer blends or as polymer toughening agents. Poly(methylmethacrylate-co-acrylate) diblock copolymers or poly(methylacrylate-co-acrylate-co-methacrylate) triblock copolymers) are useful as dispersing agents for coating systeme, as coating additives (e.g. rheolegical agents, compatibilizers, reactive diluents) or as resin component in coatings (e.g. high solid paints). Block copolymers of styrene, (meth)acrylates and/or acrylonitrile are useful as for shaping plastic articles and as modifiers for plastics, elastomers and adhesives.

Furthermore, block copolymers of this invention, wherein the blocks alternate between polar monomers and non-polar monomers, are useful in many applications as amphiphilic surfactants or dispersants for preparing highly uniform polymer blends.

The (co)polymers of the present invention may have a number average molecular weight from 1 000 to 400 000 g/mol, preferably from 2 000 to 250 000 g/mol and, more preferably, from 2 000 to 200 000 g/mol. The number average molecular weight may be determined by size exclusion chromatography (SEC), matrix assisted laser desorption/ionization mass spectrometry (MALDI-MS) or, if the initiator carries a group which can be easily distinguished from the monomer(s), by NMR spectroscopy or other conventional methods.

For instance the polymer obtained has a polydispersity of between 1.1 and 2.5, for example between 1.3 and 2.1.

In principal the polymerization can be carried out by heating or exposure to electromagnetic radiation, ranging from γ to microwaves.

Preferably the polymerization is carried out by heating and takes place at a temperature of between 50° C. and 160° C., preferably between 70° C. and 160° C.

Preferably the hydroxylamine, the nitrone or the alkyl N-oxid having a molecular weight of more than 250 is present in an amount of 0.001 to 10 mol %, in particular of 0.1 to 5 mol % based on the monomer or monomers.

If a mixture of monomerts is used, mol % is based on an average molecular weight of the monomers.

The radical polymerization initiator is, for example, present in an amount from 0.002 to 5% by weight, based on the weight of the monomer or monomers.

For instance the weight ratio between the radical polymerization initiator and the hydroxylamine, the nitrone or the alkyl N-oxid having a molecular weight of more than 250 g/mol is from 1:5 to 5:1.

Thus, the present invention also encompasses in the synthesis novel block, multi-block, star, gradient, random, hyperbranched and dendritic copolymers, as well as graft copolymers.

The polymers prepared by the present invention are useful for following applications:

adhesives, detergents, dispersants, emulsifiers, surfactants, defoamers, adhesion promoters, corrosion inhibitors, viscosity improvers, lubricants, rheology modifiers, thickeners, crosslinkers, paper treatment, water treatment, electronic materials, paints, coatings, photography, ink materials, imaging materials, superabsorbants, cosmetics, hair products, preservatives, biocide materials or modifiers for asphalt, leather, textiles, ceramics and wood.

Further aspects of the invention are a polymer or copolymer obtainable by a process as outlined above and the use of a hydroxylamine, a nitrone or an alkyl N-oxid having a molecular weight of more than 250 for the controlled polymerization of ethylenically unsaturated monomers.

Definitions and preferences for the individual components have already been given. They apply also to the other aspects of the invention.

The following examples illustrate the invention.

Compound 101: N,N,-Dioctadecyl-hydroxylamine from Fluka.

Compound 102:

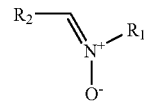

where $R_1=C_{18}$ and $R_2=C_{17}$ from Fluka.

Compound 103: Genox EP® from General Electric Speciality Chemicals, Inc. (bis (hydrogenated rape-oil alkyl) methyl, N,oxide)

Comparative compound: N,N Diethylhydroxylamine from Merck KGaA, Darmstadt, Germany Standard Polymerization Procedure:

In a dry, argon-purged Schlenk tube, the given amounts of hydroxylamine derivative and radical initiator are dissolved in 0.5 mol freshly distilled styrene. The solution is degassed in three consecutive freeze-thaw-cycles and than purged with argon. The stirred mixture/solution is then immersed in an oil bath and polymerized at 130° C. for 24 h. After polymerization, residual monomer is removed, respectively the polymer is dried under vacuum at 50° C. until a constant weight is achieved. 2.5 g of the in this way obtained macro initiator are dissolved in 15 g n-butyl acrylate and again polymerized for 6 h in the previously described manner.

Hydroxylamines were used as received.

Dibenzoyl peroxide (BPO) (Merck) was recrystallized from Methanol prior to use.

Styrene was distilled under reduced pressure prior to use.

Test Procedures:

Molecular weight and molecular weight distributions are determined by GPC on a HP 1090 liquid chromatograph (software: winGPC/Polymer Standard Services, Mainz, Germany) using THF as eluent and a column combination calibrated with narrow molecular weight polystyrene standards (Polymer Laboratories).

Styrene polymerization is carried out with the compositions presented in Table 1 at 130° C. for 24 h according to the above standard procedure.

TABLE 1

| No | Comparative Compound [mol %] | Comp 101 [mol %] | Comp. 103 [mol %] | Comp. 102 [mol %] | BPO [mol %] |
| --- | --- | --- | --- | --- | --- |
| Comparative ex. 1 | 0.05 | | | | 0.1 |
| Comparative ex. 2 | 0.1 | | | | 0.1 |
| Comparative ex. 3 | 0.15 | | | | 0.1 |
| Comparative ex. 4 | 0.2 | | | | 0.1 |
| Inventive ex. 1 | | 0.05 | | | 0.1 |
| Inventive ex. 2 | | 0.1 | | | 0.1 |
| Inventive ex. 3 | | 0.15 | | | 0.1 |
| Inventive ex. 4 | | 0.2 | | | 0.1 |
| Inventive ex. 5 | | | 0.05 | | 0.1 |
| Inventive ex. 6 | | | 0.1 | | 0.1 |
| Inventive ex. 7 | | | 0.15 | | 0.1 |

TABLE 1-continued

| No | Comparative Compound [mol %] | Comp 101 [mol %] | Comp. 103 [mol %] | Comp. 102 [mol %] | BPO [mol %] |
|---|---|---|---|---|---|
| Inventive ex. 8 | | | 0.2 | | 0.1 |
| Inventive ex. 9 | | | | 0.05 | 0.1 |
| Inventive ex. 10 | | | | 0.1 | 0.1 |
| Inventive ex. 11 | | | | 0.15 | 0.1 |
| Inventive ex. 12 | | | | 0.2 | 0.1 |

The macro initiators obtained were dried, then dissolved in n-butyl acrylate and polymerized at 130° C. for 6 h.

The conversions and polydispersities of the styrene—n-butylacrylate co-polymers obtained by the controlled radical polymerization of styrene followed by a reinitaition reaction of the obtained macroinitiators with n-butyl acrylate are summarized in Table 2.

Mn_crp symbolizes the average molecular weight of the styrenic macro initiator, Mn_reini the molecular weight of the block co-polymer, at the end of the reinitiation reaction. A positive value for Mn_reini minus Mn_crp is equal to the building up of a block structure a negative value demonstrates the decomposition of the macro initiator.

TABLE 2

| No | Conversion-crp [%] | Mn_crp [g/mol] | Mn_reini [g/mol] | Mn_reini – Mn_crp [g/mol] | Polydisp. after reinitiation |
|---|---|---|---|---|---|
| Comparative ex. 1 | 96.0 | 96700 | 80000 | −16700 | 2.8 |
| Comparative ex. 2 | 92.7 | 131000 | 90000 | −41000 | 2.2 |
| Comparative ex. 3 | 91.0 | 118000 | 75500 | −42500 | 2.8 |
| Comparative ex. 4 | 88.2 | 142000 | 100100 | −41900 | 2.1 |
| Inventive ex. 1 | 97.9 | 138500 | 201100 | 62600 | 2.3 |
| Inventive ex. 2 | 88.5 | 131800 | 134700 | 2900 | 1.8 |
| Inventive ex. 3 | 73.1 | 120500 | 169700 | 49200 | 1.8 |
| Inventive ex. 4 | 63.4 | 85080 | 115100 | 30020 | 1.9 |
| Inventive ex. 5 | 85.9 | 146400 | 198900 | 52500 | 2.7 |
| Inventive ex. 6 | 84.3 | 139100 | 153000 | 13900 | 2.1 |
| Inventive ex. 7 | 82.4 | 109600 | 168700 | 59100 | 2.3 |
| Inventive ex. 8 | 78.8 | 98600 | 144700 | 46100 | 2.3 |
| Inventive ex. 9 | 99.0 | 136400 | 180500 | 44100 | 2.5 |
| Inventive ex. 10 | 96.8 | 118000 | 185900 | 67900 | 2.6 |
| Inventive ex. 11 | 98.0 | 116600 | 158200 | 41600 | 2.4 |
| Inventive ex. 12 | 95.5 | 108000 | 165300 | 57300 | 2.3 |

Table 2 illustrates that a controlled free radical polymerization is possible with the short alkyl chain N,N diethylhydroxylamine as well as with the long alkyl chain compound 101, N,N dioctadecyl-hydroxylamine and also with the corresponding Nitrone, compound 103 (Genox EP) or methyl, N-oxide, compound 102. However, Table 2 also clearly shows that building up of a block structure is only possible for the inventive examples, indicated by the positive value of Mn_reini minus Mn_crp. The macro initiators obtained by the polymerization of styrene in the presence of N,N Diethylhydroxylamine (comparative examples) decompose under the conditions of the butylacrylate polymerization and block structures cannot be obtained.

The invention claimed is:

1. A polymerizable composition comprising
a) an ethylenically unsaturated monomer;
b) a radical polymerization initiator; and
c) a hydroxylamine having a molecular weight of more than 250 g/mol of formula A', A", B' or O'

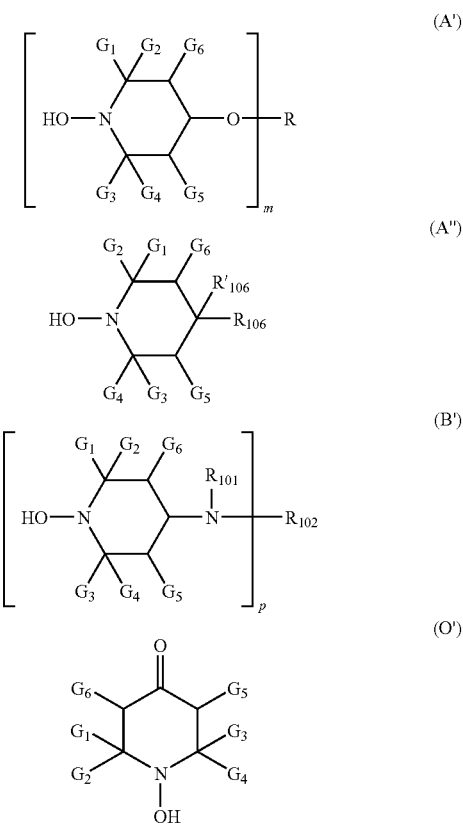

wherein
m is 1,
R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;
p is 1;
$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;
$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$-Z or of the formula —CO-Z or —CONH-Z wherein Z is hydrogen, methyl or phenyl;
$R_{106}$ and $R'_{106}$ together are both hydrogen, a group =O or =N—O—$R_{120}$ wherein $R_{120}$ is H, straight or branched $C_1$-$C_{18}$alkyl, $C_3$-$C_{18}$alkenyl or $C_3$-$C_{18}$alkinyl, which may be unsubstituted or substituted by one or more OH, $C_1$-$C_8$alkoxy, carboxy or $C_1$-$C_8$alkoxycarbonyl; or is $C_5$-$C_{12}$cycloalkyl or $C_5$-$C_{12}$cycloalkenyl;

or is phenyl, $C_7$-$C_9$phenylalkyl or naphthyl which may be unsubstituted or substituted by one or more $C_1$-$C_8$alkyl, halogen, OH, $C_1$-$C_8$alkoxy, carboxy or $C_1$-$C_8$alkoxycarbonyl;

or is —C(O)—$C_1$-$C_{36}$alkyl, or an acyl moiety of a α,β-unsaturated carboxylic acid having 3 to 5 carbon atoms or of an aromatic carboxylic acid having 7 to 15 carbon atoms;

or is —$SO_3^-Q^+$, —$PO(O^-Q^+)_2$, —$P(O)(OR_2)_2$, —$SO_2$—$R_2$, —CO—NH—$R_2$, —$CONH_2$, $COOR_2$, or $Si(Me)_3$, wherein $Q^+$ is $H^+$, ammnonium or an alkali metal cation; or $R_{106}$ and $R'_{106}$ are independently —O—$C_1$-$C_{12}$alkyl, —O—$C_3$-$C_{12}$alkenyl, —O—$C_3$-$C_{12}$alkinyl, —O—$C_5$-$C_8$cycloalkyl, —O-phenyl, —O-naphthyl or —O—$C_7$-$C_9$phenylalkyl; or $R_{106}$ and $R'_{106}$ together form one of the bivalent groups —O—C($R_{121}$)($R_{122}$)—CH($R_{123}$)—O—, —O—CH($R_{121}$)—$CH_{122}$—C($R_{122}$)($R_{123}$)—O—, —O—CH($R_{122}$)—$CH_2$—C($R_{121}$)($R_{123}$)—O—, —O—$CH_2$—C($R_{121}$)($R_{122}$)—CH($R_{123}$)—O—, —O-o-phenylene-O—, —O-1,2-cyclohexyliden-O—,

—O—$CH_2$—CH=CH—$CH_2$—O—,

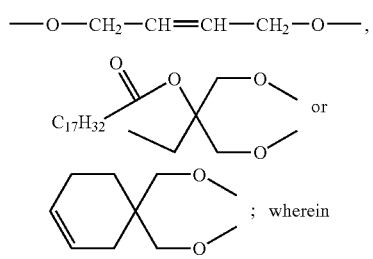 ; wherein $R_{121}$ is hydrogen, $C_1$-$C_{12}$alkyl, COOH, COO—($C_1$-$C_{12}$)alkyl or $CH_2OR_{124}$;

$R_{122}$ and $R_{123}$ are independently hydrogen, methyl ethyl, COOH or COO—($C_1$-$C_{12}$)alkyl;

$R_{124}$ is hydrogen, $C_1$-$C_{12}$alkyl, benzyl, or a monovalent acyl residue derived from an aliphatic, cycloaliphatic or aromatic monocarboxylic acid having up to 18 carbon atoms;

$G_6$ is hydrogen and $G_5$ is hydrogen or $C_1$-$C_4$alkyl, and $G_1$, $G_2$, $G_3$ and $G_4$ are methyl; or $G_1$ and $G_3$ are methyl and $G_2$ and $G_4$ are ethyl or propyl or $G_1$ and $G_2$ are methyl and $G_3$ and $G_4$ are ethyl or propyl.

2. A process for preparing an oligomer, a cooligomer, a polymer or a copolymer (block, random or graft) by free radical polymerization of at least one ethylenically unsaturated monomer or oligomer, which comprises (co)polymerizing the monomer or monomers/oligomers in the presence of
   b) a free radical initiator and
   c) a hydroxylamine, a nitrone or an alkyl N-oxid having a molecular weight of more than 250 g/mol,
where the hydroxylamine, the nitrone or the alkyl N-oxid are of formulae (I), II) or (III)

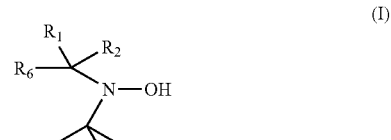 (I)

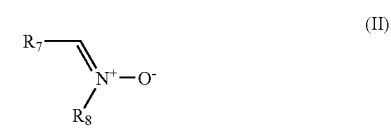 (II)

 (III)

where
$R_1$, $R_2$, $R_3$ and $R_4$ are independently hydrogen, phenyl or $C_1$-$C_4$alkyl;

$R_5$ and $R_6$ are independently $C_7$-$C_{35}$alkyl, $C_7$-$C_{35}$alkenyl or $C_7$-$C_{35}$alkinyl, which may be unsubstited or substituted by phenyl, halogen, $NH_2$, $N(R_{21})_2$, —OH, —CN, —$NO_2$, or —$COOR_{21}$; or which may be interrupted by —O— or —C(O)—; or $R_5$ and $R_6$ together are an alkylene bridge, which may be interrupted by a —O—, —C(O)— or a —N($C_1$-$C_{18}$alkyl)- group to form a heterocyclic 5, 6, 7 or 8 membered ring, which may be further substituted by a —O—C(O)—]$_n$$R_{20}$, $NR_{21}$—C(O)—]$_n$$R_{20}$ or a ketal group;

n is 1 or 2; wherein, when n is 1, $R_{20}$ is hydrogen or $C_1$-$C_{18}$alkyl and, when n is 2, $R_{20}$ is $C_1$-$C_{18}$alkylene; $R_{21}$ is hydrogen or $C_1$-$C_{18}$alkyl;

$R_7$ and $R_8$ are independently $C_8$-$C_{36}$alkyl; and $R_9$ is $C_1$-$C_4$alkyl.

3. A process according to claim 2 wherein the polymer obtained has a polydispersity of between 1.1 and 2.5.

4. A process according to claim 2 wherein the polymerization is carried out by heating and takes place at a temperature of between 70° C. and 16° C.

5. A process according to claim 2 wherein the hydroxylamine, the nitrone or the alkyl N-oxid having a molecular weight of more than 250 g/mol is present in an amount of 0.001 to 10 mol % based on the monomer or monomers.

6. A process according to claim 2 wherein the weight ratio between the radical polymerization initiator and the hydroxylamine, the nitrone or the alkyl N-oxid having a molecular weight of more than 250 g/mol is from 1:5 to 5:1.

7. A process for preparing an oligomer, a cooligomer, a polymer or a copolymer (block, random or graft) by free radical polymerization of at least one ethylenically unsaturated monomer or oligomer, which comprises (co)polymerizing the monomer or monomers/oligomers in the presence of
   b) a free radical initiator and
   c) a hydroxylamine having a molecular weight of more than 250 g/mol of formula A', A", B' or O'

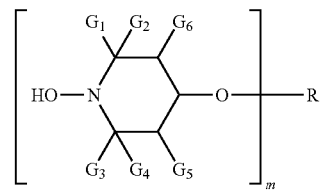 (A')

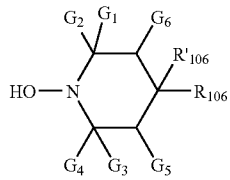 (A")

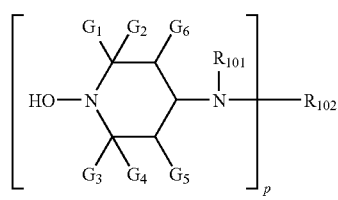 (B')

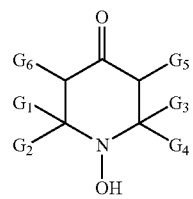 (O')

wherein
m is 1
R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;
p is 1;
$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;
$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$-Z or of the formula —CO-Z or —CONH-Z wherein Z is hydrogen, methyl or phenyl;

$R_{106}$ and $R'_{106}$ together are both hydrogen, a group =O or =N—O—$R_{120}$ wherein
$R_{120}$ is H, straight or branched $C_1$-$C_{18}$alkyl, $C_3$-$C_{18}$alkenyl or $C_3$-$C_{18}$alkinyl, which may be unsubstituted or substituted by one or more OH, $C_1$-$C_8$alkoxy, carboxy or $C_1$-$C_8$alkoxycarbonyl; or is $C_5$-$C_{12}$cycloalkyl or $C_5$-$C_{12}$cycloalkenyl;
or is phenyl, $C_7$-$C_9$phenylalkyl or naphthyl which may be unsubstituted or substituted by one or more $C_1$-$C_8$alkyl, halogen, OH, $C_1$-$C_8$alkoxy, carboxy or $C_1$-$C_8$alkoxycarbonyl;
or is —C(O)—$C_1$-$C_{36}$alkyl, or an acyl moiety of a α,β-unsaturated carboxylic acid having 3 to 5 carbon atoms or of an aromatic carboxylic acid having 7 to 15 carbon atoms;
or is —$SO_3^-Q^+$, —$PO(O^-Q^+)_2$, —$P(O)(OR_2)_2$, —$SO_2$—$R_2$, —CO—NH—$R_2$, —$CONH_2$, $COOR_2$, or $Si(Me)_3$, wherein $Q^+$ is $H^+$, ammnonium or an alkali metal cation; or
$R_{106}$ and $R'_{106}$ are independently —O—$C_1$-$C_{12}$alkyl, —O—$C_3$-$C_{12}$alkenyl, —O—$C_3$-$C_{12}$alkinyl, —O—$C_5$-$C_8$cycloalkyl, —O-phenyl, —O-naphthyl or —O—$C_7$-$C_9$phenylalkyl; or
$R_{106}$ and $R'_{106}$ together form one of the bivalent groups —O—C($R_{121}$)($R_{122}$)—CH($R_{123}$)—O—, —O—CH($R_{121}$)—$CH_{122}$—C($R_{122}$)($R_{123}$)—O—, —O—CH($R_{122}$)—$CH_2$—C($R_{121}$)($R_{123}$)—O—, —O—$CH_2$—C($R_{121}$)($R_{122}$)—CH($R_{123}$)—O—, —O-o-phenylene-O—, —O-1,2-cyclohexyliden-O—,

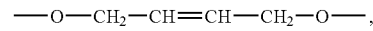

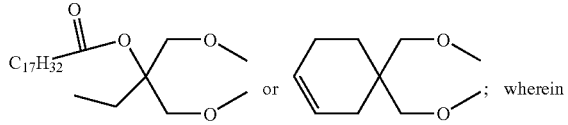

$R_{121}$ is hydrogen, $C_1$-$C_{12}$alkyl, COOH, COO—($C_1$-$C_{12}$)alkyl or $CH_2OR_{124}$;
$R_{122}$ and $R_{123}$ are independently hydrogen, methyl ethyl, COOH or COO—($C_1$-$C_{12}$)alkyl;
$R_{124}$ is hydrogen, $C_1$-$C_{12}$alkyl, benzyl, or a monovalent acyl residue derived from an aliphatic, cycloaliphatic or aromatic monocarboxylic acid having up to 18 carbon atoms;
$G_6$ is hydrogen and $G_5$ is hydrogen or $C_1$-$C_4$alkyl, and $G_1$, $G_2$, $G_3$ and $G_4$ are methyl; or
$G_1$ and $G_3$ are methyl and $G_2$ and $G_4$ are ethyl or propyl or $G_1$ and $G_2$ are methyl and $G_3$ and $G_4$ are ethyl or propyl.

* * * * *